United States Patent
Park et al.

(10) Patent No.: US 11,143,744 B2
(45) Date of Patent: Oct. 12, 2021

(54) METHOD FOR ATTENUATING LEAKAGE SIGNAL IN FMCW RADAR AND RADAR SYSTEM THEREFOR

(71) Applicant: KOREA ADVANCED INSTITUTE OF SCIENCE AND TECHNOLOGY, Daejeon (KR)

(72) Inventors: SeongOok Park, Daejeon (KR); Junhyeong Park, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 269 days.

(21) Appl. No.: 16/264,785

(22) Filed: Feb. 1, 2019

(65) Prior Publication Data
US 2020/0116822 A1  Apr. 16, 2020

(30) Foreign Application Priority Data

Oct. 11, 2018 (KR) .................. 10-2018-0121078
Nov. 1, 2018 (KR) .................. 10-2018-0132837

(51) Int. Cl.
| | | |
|---|---|---|
| *G01S 7/35* | (2006.01) | |
| *H04B 1/525* | (2015.01) | |
| *G01S 7/02* | (2006.01) | |
| *G01S 7/282* | (2006.01) | |
| *G01S 13/34* | (2006.01) | |
| *G01S 13/36* | (2006.01) | |
| *H04B 1/04* | (2006.01) | |

(52) U.S. Cl.
CPC .............. *G01S 7/354* (2013.01); *G01S 7/023* (2013.01); *G01S 7/282* (2013.01); *G01S 13/346* (2013.01); *G01S 13/36* (2013.01); *H04B 1/525* (2013.01); *G01S 7/356* (2021.05); *H04B 1/0475* (2013.01)

(58) Field of Classification Search
CPC ...... H04B 1/525; H04B 1/0475; H04B 1/475; H04B 1/30; H04L 27/0014; H04L 27/14; H04L 27/6118; G01S 7/40; G01S 7/354; G01S 7/352; G01S 2007/356; G01S 13/02
USPC ...... 455/296, 63.1, 266.1; 348/192; 342/196
See application file for complete search history.

(56) References Cited

U.S. PATENT DOCUMENTS

| | | | | |
|---|---|---|---|---|
| 6,836,240 | B1* | 12/2004 | Dubbert .................. | G01S 7/282 342/194 |
| 10,101,438 | B2* | 10/2018 | Subburaj ............... | G01S 13/003 |
| 10,670,698 | B2* | 6/2020 | Melzer .................. | G01S 7/4008 |
| 2011/0006944 | A1* | 1/2011 | Goldman ............ | G01S 13/9054 342/25 A |
| 2015/0378017 | A1* | 12/2015 | Ferguson .............. | G01S 13/343 342/120 |
| 2017/0307729 | A1* | 10/2017 | Eshraghi ............... | G01S 13/931 |
| 2018/0074168 | A1* | 3/2018 | Subburaj ................ | G01S 13/88 |
| 2020/0319300 | A1* | 10/2020 | Ioffe ....................... | G01S 7/415 |
| 2021/0011118 | A1* | 1/2021 | Subburaj ............... | G01S 13/343 |

* cited by examiner

*Primary Examiner* — Erin F Heard
*Assistant Examiner* — Michael W Justice
(74) *Attorney, Agent, or Firm* — Heslin Rothenberg Farley & Mesiti, P.C.

(57) ABSTRACT

A method for attenuating a leakage signal in an FMCW radar system and a radar system thereof are provided. The method includes concentrating a phase noise of the leakage signal on a stationary point and attenuating the phase noise based on the concentration of the phase noise on the stationary point.

8 Claims, 9 Drawing Sheets

METHOD FOR ATTENUATING LEAKAGE SIGNAL IN FMCW RADAR AND RADAR SYSTEM THEREFOR

CROSS-REFERENCE TO RELATED APPLICATIONS

This application claims priority under 35 U.S.C. § 119 to Korean Patent Application No. 10-2018-0121078, filed on Oct. 11, 2018, and Korean Patent Application No. 10-2018-0132837, filed on Nov. 1, 2018, in the Korean Intellectual Property Office, the disclosures of which are incorporated by reference herein in their entireties.

BACKGROUND

Embodiments of the inventive concept described herein relate to technologies of attenuating a leakage signal in a frequency modulated continuous wave (FMCW) radar, and more particularly, relate to a method for attenuating a leakage signal to increase a signal to noise ratio (SNR) of a target signal by attenuating the leakage signal and a radar system therefor.

An FMCW radar has been used for various purposes, for example, moving target detection, level meters, altitude indicators, biometric signal detection, weather prediction and analysis, and image detection as well as simple static target detection. In comparison with the pulse radar, the FMCW radar has advantages in the cost, the peak power, and the minimum detectable range. However, there is a problem in which the leakage signal from a transmitter into a receiver has several bad influences on the FMCW radar. There is a phenomenon in which the SNR of the target signals is seriously reduced by increasing the noise floor over the overall frequency domain in the power spectrum result which is finally obtained, which is a representative phenomenon the leakage signal causes. At this time, the cause of the noise floor which is increased over the overall frequency is the phase noise of the leakage signal. Thus, as the leakage signal itself is increased or the phase noise of the leakage signal is not good, the SNR of the target signals may deteriorate. To attenuate the leakage signal to address this, there is a need for a technique of mitigating the leakage signal itself or attenuating the phase noise.

As a previous technique, first of all, there is a method for configuring a large closed loop from radio frequency (RF) stage to base stage. The splitting coupler capable of splitting the transmission signal is put in the closed loop. The method is to adaptively extract the error vector for the amplitude and phase information of the leakage signal to compensate it to generate a phase opposite to that of the leakage signal, to add the generated signal to the leakage signal using the synthesizing coupler to attenuate the leakage signal itself. However, the method needs many additional components to configure the above closed loop, so additional costs according to it are incurred.

As another previous technique, there is a method for generating the signal with high correlation with the beat signal of the leakage signal and subtracting it from the beat signal of the leakage signal to attenuate the leakage signal itself. The method is to establish the channel capable of generating the artificial on-chip target with components capable of playing a role as the delay block and the amplification block to generate the signal with high correlation and to analyze correlation characteristics of the phase noise for the beat signal of the leakage signal to reflect the generated phase noise in the channel for the on-chip target and finally generate the signal with high correlation with the beat signal of the leakage signal. However, the method also incurs additional costs according to additional components to establish the additional channels.

SUMMARY

Embodiments of the inventive concept provide a method for attenuating a leakage signal to attenuate a leakage signal and increase an SNR of a target signal by attenuating a phase noise of the leakage signal and lowering a noise floor over an overall spectrum and an apparatus therefor.

According to an exemplary embodiment, a method for attenuating a leakage signal may include concentrating a phase noise of the leakage signal on a stationary point and attenuating the phase noise based on the concentration of the phase noise on the stationary point.

The concentrating may include concentrating the phase noise on the stationary point using a stationary point concentration (SPC) technique of concentrating the phase noise of the leakage signal on a stationary point of a cosine function.

The concentrating may include concentrating the phase noise on the stationary point by setting an intermediate frequency (IF) carrier frequency included in beat signals to a predetermined frequency and oversampling the beat signals to a predetermined oversampling frequency based on a Nyquist sampling theorem.

The concentrating may include performing fast Fourier transform (FFT) with zero-padding with respect to the oversampled beat signals, obtaining a spectrum in the form of magnitude response, and fining an index of a leakage signal as a beat signal with peak searching, extracting a beat frequency value of the leakage signal based on the index of the leakage signal, extracting a constant phase value of the leakage signal based on the index of the leakage signal, generating a digital numerically controlled oscillator (NCO) based on the beat frequency value and the constant phase value, and conducting down-conversion of multiplying the oversampled beat signals and the digital NCO to remove a beat frequency and phase of the leakage signal.

According to an exemplary embodiment, a radar system may include a first means configured to concentrate a phase noise of the leakage signal on a stationary point and a second means configured to attenuate the phase noise based on the concentration of the phase noise on the stationary point.

The first means may be configured to concentrate the phase noise on the stationary point using an SPC technique of concentrating the phase noise of the leakage signal on a stationary point of a cosine function.

The first means may be configured to concentrate the phase noise on the stationary point by setting an IF carrier frequency included in beat signals to a predetermined frequency and oversampling the beat signals to a predetermined oversampling frequency based on a Nyquist sampling theorem.

The first means may be configured to perform FFT with zero-padding with respect to the oversampled beat signals, obtain a spectrum in the form of magnitude response, and fine an index of a leakage signal as a beat signal with peak searching, extract a beat frequency value of the leakage signal based on the index of the leakage signal and extract a constant phase value of the leakage signal based on the index of the leakage signal, and generate a digital NCO based on the beat frequency value and the constant phase value and conduct down-conversion of multiplying the oversampled beat signals and the digital NCO to remove a beat frequency and phase of the leakage signal.

According to an exemplary embodiment, a radar system may include a transmit (TX) radio frequency (RF) stage, a receive (RX) RF stage, a TX IF stage, an RX IF stage, an analog to digital converter (ADC), and a leakage signal attenuation stage. The ADC may be configured to oversample a beat signal at the RX IF stage to a predetermined oversampling frequency. The leakage signal attenuation stage may be configured to extract a beat frequency value and a constant phase value of the leakage signal as the beat signal, generate a digital NCO with the extracted beat frequency value and the extracted constant phase value, and conduct the last down-conversion of multiplying the digital NCO and the oversampled beat signals.

The leakage signal attenuation stage may be configured to perform FFT with zero-padding with respect to the oversampled beat signals, obtain a spectrum in the form of magnitude response, and fine an index of the leakage signal as the beat signal with peak searching, extract a beat frequency value of the leakage signal based on the index of the leakage signal and extract a constant phase value of the leakage signal based on the index of the leakage signal, and generate the digital NCO based on the beat frequency value and the constant phase value and conduct down-conversion of multiplying the oversampled beat signals and the digital NCO to remove the beat frequency and phase of the leakage signal.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
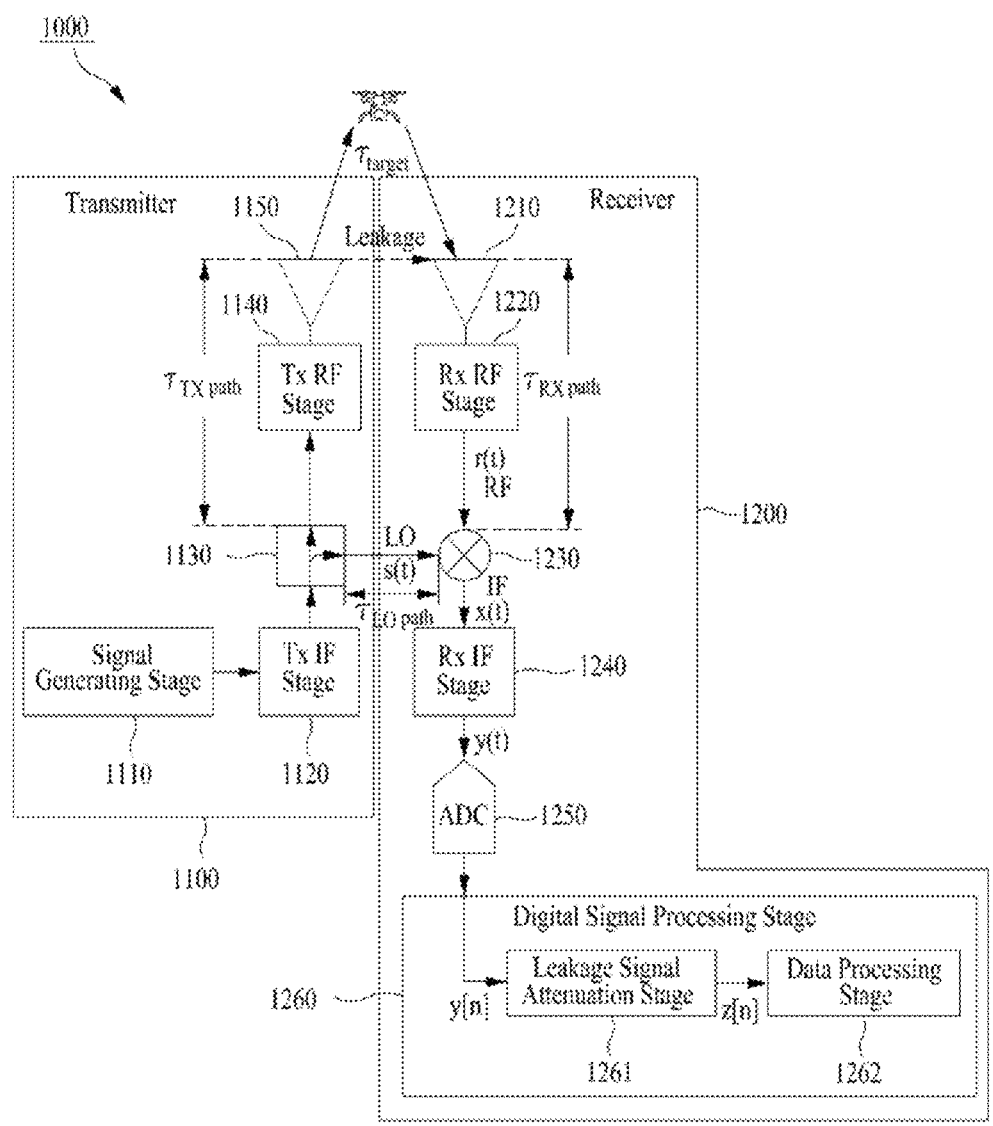
FIG. 1 is a block diagram illustrating a configuration of an FMCW radar system according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

The noise floor in the last power spectrum result is subject to the phase noise immediately before the leakage signal, which is generally much larger than the target signal, is input from the receiver to the analog to digital converter (ADC) through several blocks.

Embodiments of the inventive concept may be the gist of attenuating a leakage signal to increase an SNR of a target signal by attenuating a phase noise of the leakage signal and lowering a noise floor over an overall spectrum.

Herein, embodiments of the inventive concept may attenuate the phase noise of the leakage signal using a stationary point concentration (SPC) technique.

FIG. 1 is a block diagram illustrating a configuration of an FMCW radar system according to an embodiment of the inventive concept. FIG. 1 illustrates a configuration of an FMCW radar system to which an SPC technique is applied.

Referring to FIG. 1, a radar system 1000 according to an embodiment of the inventive concept may include a transmitter 1100 and a receiver 1200.

A linear frequency modulation (LFM) signal generated by a signal generating stage (or a signal generator) of the transmitter 1100 may be divided by a splitter 1130 via a transmit (TX) intermediate frequency (IF) stage 1120 including amplifiers, filters, mixers, a local oscillator (LO), isolators, or the like. One of the two outputs split by the splitter 1130 may be input to a TX radio frequency (RF) stage 1140, and the other, called as reference FMCW signal, may be input to a mixer 1230 for beat signal generation in the receiver 1200.

In this case, the reference FMCW signal may be represented as Equation 1 below at an LO port of the mixer 1230 for beat signal generation.

$$s(t)=A_S \cos(2\pi f_{TX}t+\pi\alpha t^2+\theta_S+\varphi_S(t)), \text{ for } 0<t<T \quad \text{[Equation 1]}$$

Herein, $A_S$ and $f_{TX}$ denote the amplitude and the start frequency of the reference LFM signal, $\alpha=BW/T$ denotes the slope, BW and T denote the sweep bandwidth and the sweep period, $\theta_S$ and $\varphi_S(t)$ denote the phase and the phase noise.

The delay, $\tau_{LO\ path}$, from the splitter 1130 to the mixer 1230 for beat signal generation is considered together with the other delays at the RF port. The other of the outputs of the splitter 1130 may be finally up-converted to an RF band through the TX RF stage 1140, including cables, an LO, mixers, filters, isolators, power amplifiers (PAs), or the like, and may be emitted via a TX antenna 1150.

Thus, another internal delay, $\tau_{RXpath}$, may be added from the splitter 1130 to the TX antenna 1150. The emitted electromagnetic wave may immediately leak to a receive (RX) antenna 1210 and may be received by the RX antenna 1210 of the receiver 1200 together with electromagnetic waves delayed by the round trip delay, $\tau_{T,k}$ which is reflected by several targets, for example, k targets, and returns again.

The signals received through the RX antenna 1210 may be down-converted into an IF band through an RX RF stage 1220, including low noise amplifiers (LNAs), isolators, an LO, mixers, filters, cables, or the like, and may be input to an RF port of the mixer 1230 for beat signal generation. The signals received from the RX antenna 1210 to the RF port of the mixer 1230 for beat signal generation may be delayed by $\tau_{RXpath}$.

Thus, the RX signals input to the RF port of the mixer 1230 for beat signal generation may be represented as Equation 2 below when considering Equation 1 above.

$$r(t) = \underbrace{A\cos(2\pi f_{RX}(t-\tau_{int.}) + \pi\alpha(t-\tau_{int.})^2 + \theta_R + \varphi_L(t))}_{Leakage}$$

$$+ \underbrace{\sum_{k}^{K} A_{T,k}\cos(2\pi f_{RX}(t-\tau_{int.}-\tau_{T,k}) + \pi\alpha(t-\tau_{int.}-\tau_{T,k})^2 + \theta_R + \varphi_{T,k}(t))}_{Targets}$$

[Equation 2]

Herein, $\theta_R$ denotes the phase of the received LMF signals, $A_L$, $A_T$, $\varphi_L(t)$, and $\varphi_{T,k}(t)$ denote the amplitude of the leaked LFM signal, the amplitudes of the LFM signals reflected by the targets, the phase noise of the leaked LFM signal, and the phase noises of the LFM signals reflected by the targets, respectively, $f_{RX}$ denotes the start frequency of the LMF signals received after down-conversion, and $\tau_{int.}$ denotes total internal delay.

The total internal delay $\tau_{int.}$ may be represented as Equation 3 below. The phase noise $\varphi_L(t)$ of the leaked LFM signal and the phase noise $\varphi_{T,k}(t)$ of the LFM signals reflected by the targets may be represented as Equation 4 below and Equation 5 below.

$$\tau_{ini.} = \tau_{TXpath} + \tau_{RXpath} - \tau_{LOpath} \quad \text{[Equation 3]}$$

$$\varphi_L(t) \approx \varphi_S(t-\tau_{ini.}) + \varphi_{TXRFLO}(t-\tau_{TXpath}-\tau_{RXpath}) - \varphi_{RXRFLO}(t-\tau_{RXpath}) \quad \text{[Equation 4]}$$

$$\varphi_{T,k}(t) \approx \varphi_S(t-\tau_{ini.}-\tau_{T,k}) + \varphi_{TXRFLO}(t-\tau_{TXpath}-\tau_{RXpath}-\tau_{T,k}) - \varphi_{RXRFLO}(t-\tau_{RXpath}-\tau_{T,k}) \quad \text{[Equation 5]}$$

The mixer 1230 for beat signal generation may multiply Equation 1 above and Equation 2 above to output a beat signal to the RF port. Since sum-terms among results of the trigonometric function product are easily filtered, when disregarding it and considering only difference-terms, beat signals may be represented as Equation 6 below.

$$x(t) = x_{IFleakage}(t) + x_{IFtargets}(t) = \quad \text{[Equation 6]}$$

$$\frac{A_S A_L}{2}\cos\left[2\pi(\underbrace{\overbrace{f_{TX}-f_{RX}}^{f_{IFbeatleakage}} + \frac{\alpha\tau_{int.}}{f_{beatleakage}}}_{f_{IFcarrier}})t + \right.$$

$$\left. \underbrace{\theta_S + 2\pi f_{RX}\tau_{int.} - \pi\alpha\tau_{int.}^2 - \theta_R}_{\theta_{IFleakage}} + \varphi_{IFleakage}(t)\right]$$

$$+ \sum_{k=1}^{K} \frac{A_S A_{T,k}}{2}$$

$$\cos\left[2\pi(\underbrace{\overbrace{\underbrace{f_{TX}-f_{RX}}_{f_{IFcarrier}} + \frac{\alpha\tau_{int.}}{f_{beatleakage}}}^{f_{IFbeatleakage}} + \frac{\alpha\tau_{T,k}}{f_{beatleakage,k}}}_{f_{IFbeattargets,k}})t + \right.$$

$$\left. \underbrace{\theta_S + 2\pi f_{RX}(\tau_{ini.}+\tau_{T,k}) - \pi\alpha(\tau_{ini.}+\tau_{T,k})^2 - \theta_R}_{\theta_{IFtargets,k}} + \varphi_{IFtargets,k}(t)\right]$$

The phase noise of the leakage signal as the IF beat signal and the phase noise of the signals of the targets, $\varphi_{IFleakage}(t)$ and $\varphi_{IFtarget,k}(t)$, are represented as Equations 7 and 8 below.

$$\varphi_{IFleakage}(t) = \varphi_S(t) - \varphi_S(t-\tau_{ini.}) - \varphi_{TXRFLO}(t-\tau_{TXpath}-\tau_{RXpath}) + \varphi_{RXRFLO}(t-\tau_{RXpath}) \quad \text{[Equation 7]}$$

$$\varphi_{IFtargets,k}(t) = \varphi_S(t) - \varphi_S(t-\tau_{ini.}-\tau_{T,k}) - \varphi_{TXRFLO}(t-\tau_{TXpath}-\tau_{RXpath}-\tau_{T,k}) + \varphi_{RXRFLO}(t-\tau_{RXpath}-\tau_{T,k}) \quad \text{[Equation 8]}$$

Seeing Equation 6 above, when the leakage signal is finally the beat signal, the beat frequency of the leakage, $f_{beatleakage}$, comes from the total internal delay $\tau_{ini.}$. The common FMCW radar may allow the beat signal not to have the IF carrier frequency when $f_{TX} = f_{RX}$. Alternatively, although the common FMCW allows the beat signal to have the IF carrier frequency, it may mix the LO like Equation 9 below to get rid of the IF carrier frequency $f_{IFcarrier}$.

$$LO_{common}(t) = A_{LO}\cos(2\pi f_{IFcarrier}t + \theta_{LO} + \varphi_{LO}(t)) \quad \text{[Equation 9]}$$

Herein, $A_{LO}$, $\theta_{LO}$, and $\varphi_L(t)$ denote the amplitude, the phase, and the phase noise of the LO which may exist at the RX IF stage 1240, respectively.

Thus, in case of the common FMCW radar to which an embodiment of the inventive concept is not applied, the form of the final signal for processing data may be represented as Equation 10 below.

$$y_{common}(t) = y_{leakage}(t) + y_{target}(t) = \quad \text{[Equation 10]}$$

$$\underbrace{A_{leakage}\cos(2\pi f_{beatleakage}\,t + \theta_{leakage} + \varphi_{leakage}(t))}_{Leakage} +$$

$$\underbrace{\sum_{k=1}^{K} A_{targets,k}\cos(2\pi(f_{beatleakage} + f_{beattargets,k})t + \theta_{targets,k} + \varphi_{targets,k}(t))}_{Targets}$$

Herein, $A_{leakage}=A_S A_L A_{LO}/4$, $A_{targets,k}=A_S A_{T,k} A_{LO}/4$, $\theta_{leakage}=\theta_{IF\ leakage}-\theta_{LO}$, $\theta_{targets,k}=\theta_{IF\ targets,k}-\theta_{LO}$, $\varphi_{leakage}(t)=\varphi_{IF\ leakage}(t)-\varphi_{LO}(t)$, and $\varphi_{targets,k}(t)=\varphi_{IF\ targets,k}(t)-\varphi_{LO}(t)$.

As may be observed in FIG. 10, the beat frequency $f_{beatleakage}$, which comes from the total internal delay $\tau_{int.}$, is finally added to the real beat frequency $f_{beattargets,k}$, which comes from the delay $\tau_{T,k}$ due to the targets, to cause the offset to the beat frequency of the target signals. This is the cause of the distance error, when a data processing stage 1262 calculates the distance of the targets.

According to the cosine sum identity, the leakage signal expressed in Equation 10 above may be transformed as Equation 11 below.

$$y_{leakage}(t)=A_{leakage}\cos(2\pi f_{beatleakage}t+\theta_{leakage})\cos(\varphi_{leakage}(t))-A_{leakage}\sin(2\pi f_{beatleakage}t+\theta_{leakage})\sin(\varphi_{leakage}(t))$$ [Equation 11]

Generally, since the phase noise is much smaller than 1, Equation 11 above may be approximated as Equation 12 below.

$$y_{leakage}(t) \approx A_{leakage}\cos(2\pi f_{beakleakage}\ t+\theta_{leakage})-\underbrace{A_{leakage}\varphi_{leakage}(t)\sin(2\pi f_{beatleakage}\ t+\theta_{leakage})}_{\text{Major cause of the noise floor rise}}$$ [Equation 12]

As expressed in Equation 12 above, generally, the term of having a dominant influence on the noise floor is the second term indicated behind. Seeing this second term, the phase noise of the leakage signal may be up-converted to $f_{beatleakage}$, and it may manifest itself as voltage or current noise. Since $A_{leakage}$ is generally much larger than $A_{targets,k}$, a strong leakage signal and the phase noise may lead to the increase in the noise floor over the overall frequency in the final power spectrum.

The concept of the SPC technique provided by an embodiment of the inventive concept may show the mathematical difference from the common method from Equation 9 above. The common FMCW radar may remove only the IF carrier frequency $f_{IFcarrier}$, whereas the SPC technique may remove the beat frequency $f_{beatleakage}$, which comes from the total internal delay $\tau_{int.}$, and the phase $\theta_{IFleakage}$ of the leakage signal as the beat signal at the IF stage as well as the IF carrier frequency $f_{IFcarrier}$. In other words, when using the analog LO such as Equation 9 in the SPC technique, the LO such as Equation 13 below may be applied.

$$LO_{proposed}(t)=A_{LO}\cos(2\pi f_{IFbeatleakage}t+\theta_{IFleakage}+\varphi_{LO}(t))$$ [Equation 13]

Thus, when applying the SPC technique, Equation 14 below may be represented differently from Equation 10 above.

$$y_{Proposed}(t) = \underbrace{A_{leakage}\cos(\varphi_{leakage}(t))}_{\text{Leakage}} + \underbrace{\sum_{k=1}^{K} A_{targets,k}\cos(2\pi f_{beattargets,k}\ t + \theta'_{targets,k} + \varphi_{targets,k}(t))}_{\text{Targets}}$$ [Equation 14]

Herein, $\theta'_{targets,k}=\theta_{IFtargets,k}-\theta_{IFleakage}$.

In other words, the term of having a dominant influence on the noise floor, which may be observed in Equation 12 above, may be removed from Equation 14 above by the SPC technique. When the approximation applied in Equation 12 above is applied to Equation 14 above, the leakage signal may be represented as just a dc value of $A_{leakage}$.

Figure 3:
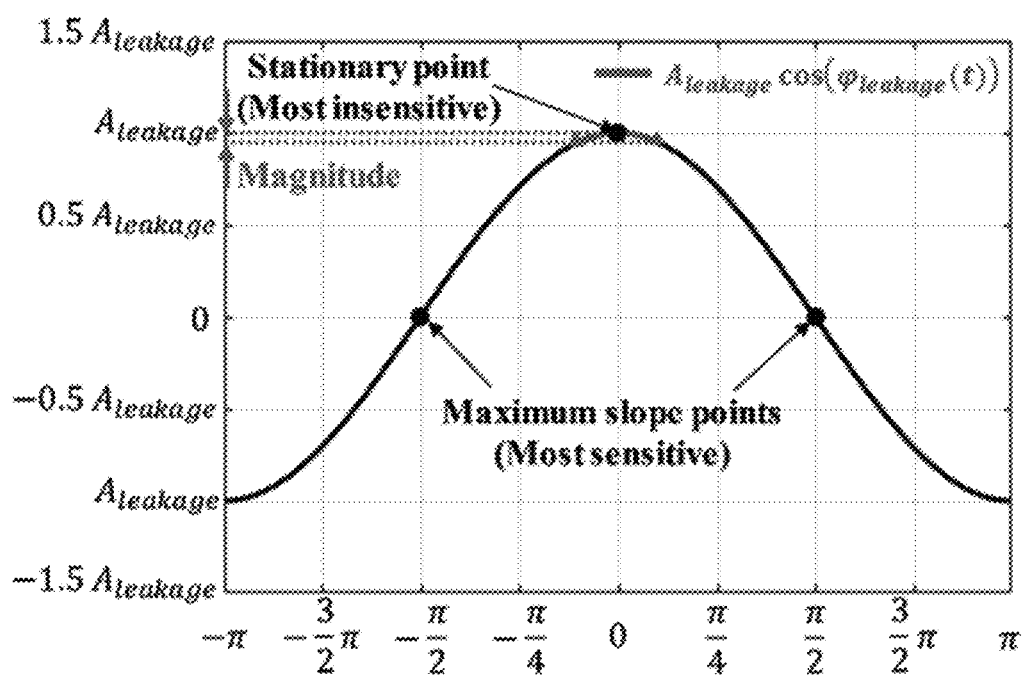
FIG. 3 is a drawing illustrating the concept of a stationary point concentration (SPC) technique.

FIG. 3 is a drawing illustrating the concept of an SPC technique. The SPC technique considering the real situation which does not use the approximation may be analyzed with reference to FIG. 3.

In case of the common method, in the term of the leakage signal in Equation 10 above, the phase noise may tremble at every point on the graph drawn with the black solid line, which includes the maximum slope points (the most sensitive points). On the other hand, when an embodiment of the inventive concept is applied, in the term of the leakage signal in Equation 14 above, the phase noise may trembles only at the stationary point (the most insensitive point) on the graph drawn with the black solid line of FIG. 3. Therefore, when an embodiment of the inventive concept is applied, the magnitude of the phase noise indicated as voltage or current may be more significantly decreased than the common method, and the mitigation of the leakage signal is possible, thus significantly increasing the SNR of the target signals.

Also, seeing the term associated with the target signals of Equation 14 above, thanks to the SPC technique, the beat frequency, $f_{beatleakage}$, which comes from the total internal delay $\tau_{int.}$, which exists as the offset frequency in the target signals, may be removed, and only the real beat frequency $f_{beattargets,k}$, which comes from the delay $\tau_{T,k}$ due to the targets, may remain. Thus, the delay compensation in the radar system, that is, the distance error compensation acts as the additional effect.

Figure 4:
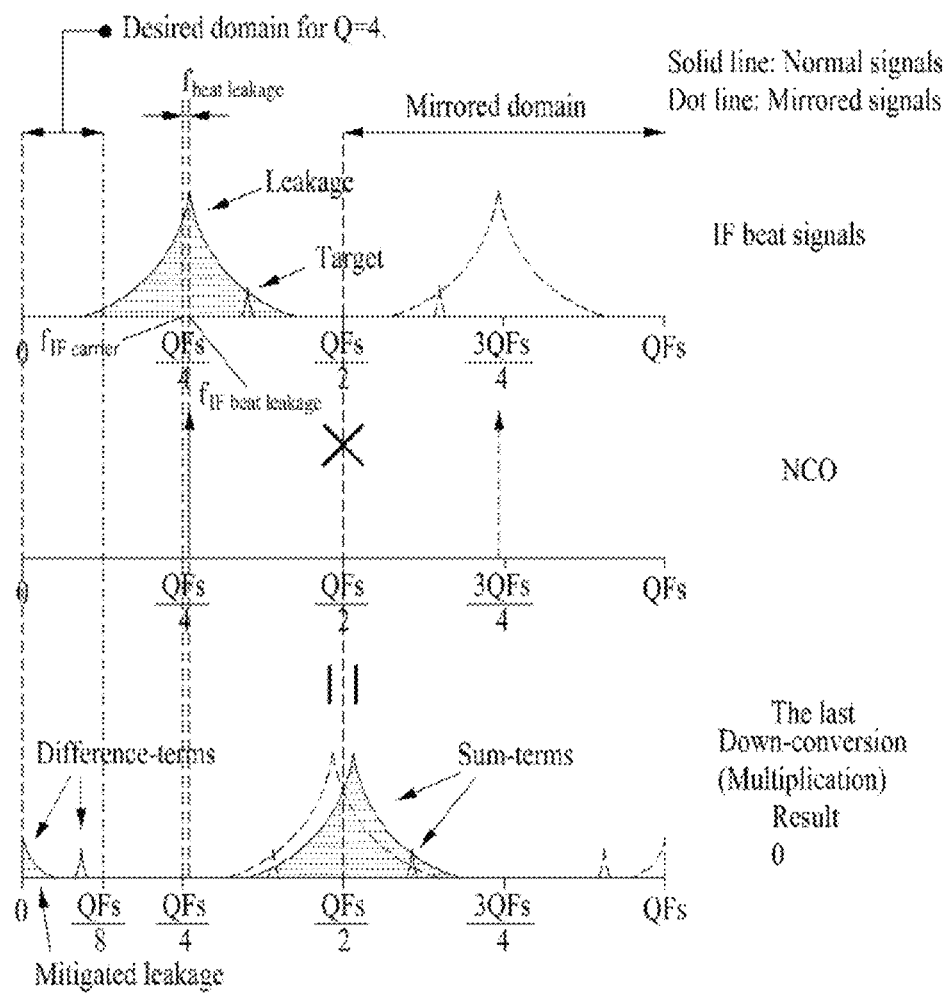
FIG. 4 is a drawing illustrating a process of implementing an SPC technique as a power spectrum.
Figure 5:
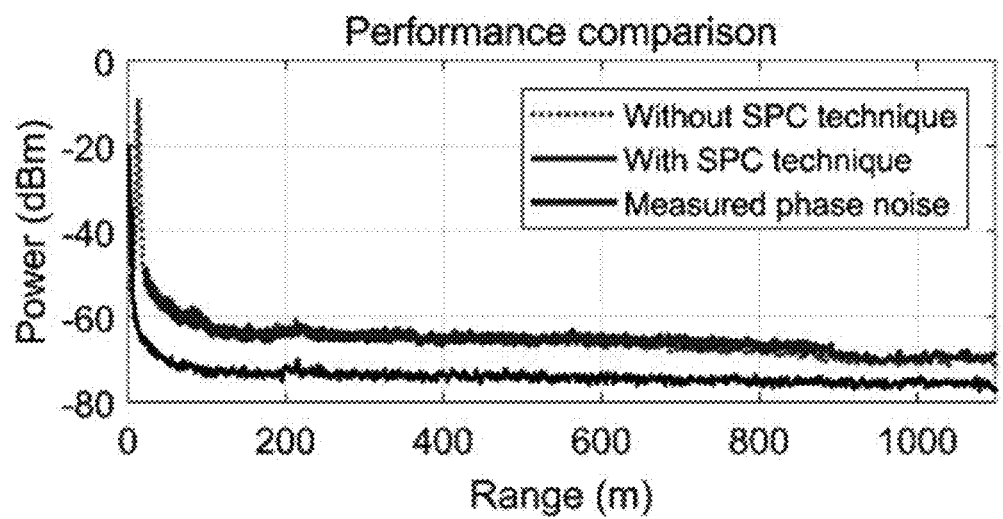
FIG. 5 is a drawing illustrating an example of the results of an average power spectrum with or without an SPC technique in a situation where there is only a leakage signal.
Figure 6A:
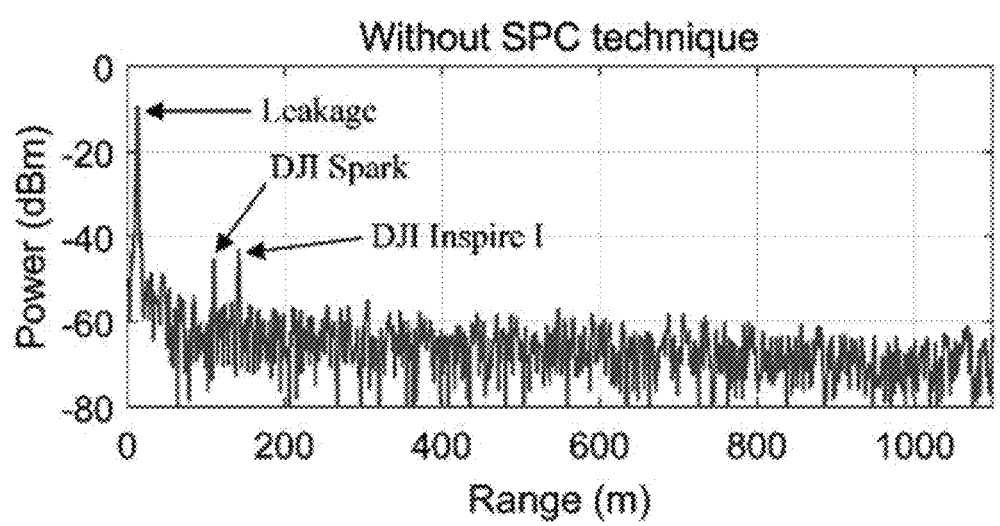
FIGS. 6A, 6B, and 6C are drawings illustrating an example of the results of a real-time power spectrum with or without an SPC technique in a situation where there are a leakage signal and targets.
Figure 6B:
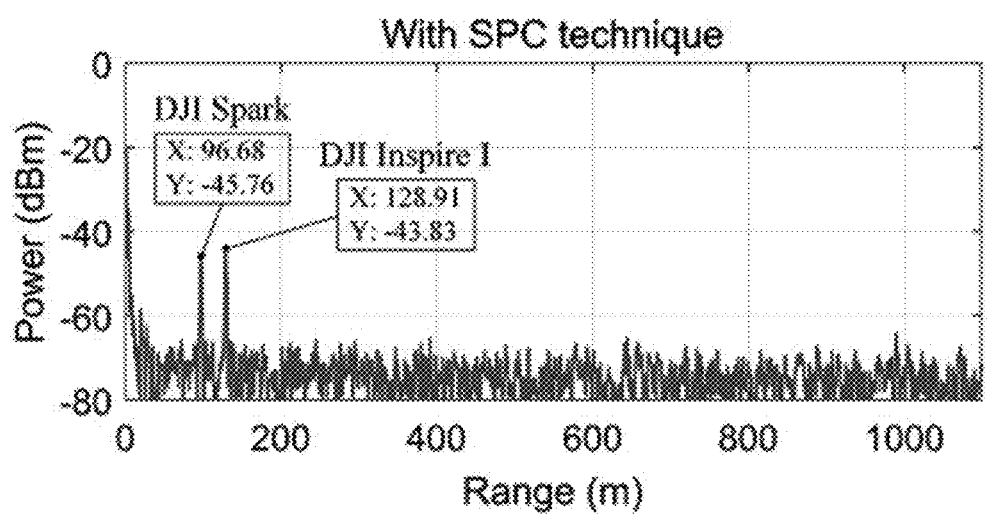
Figure 6C:
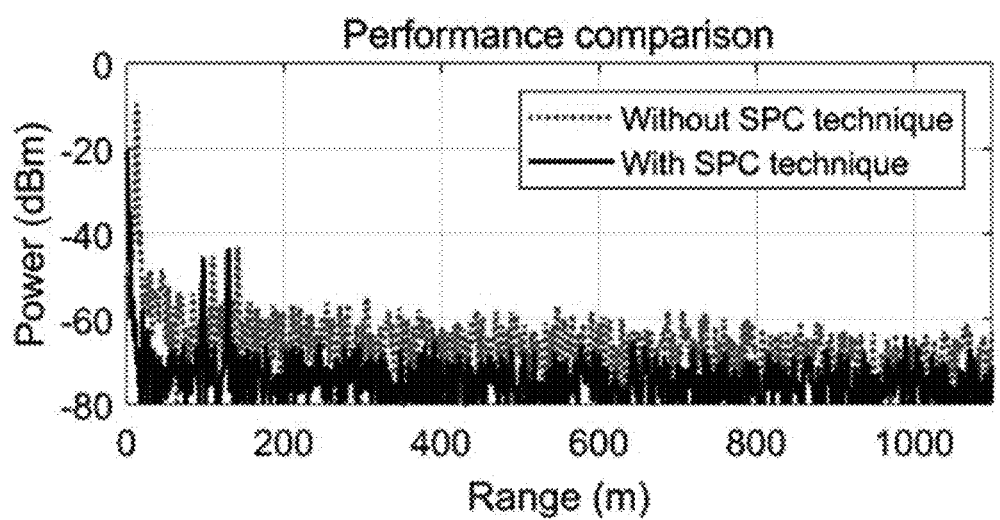

The effects of the SPC techniques applied to an embodiment of the inventive concept may be verified with reference to FIGS. 5 to 6C. To actually implement the SPC technique, the strategic frequency planning and oversampling described with reference to FIGS. 2 and 4 may be applied to the FMCW radar system shown in FIG. 1.

Figure 2:
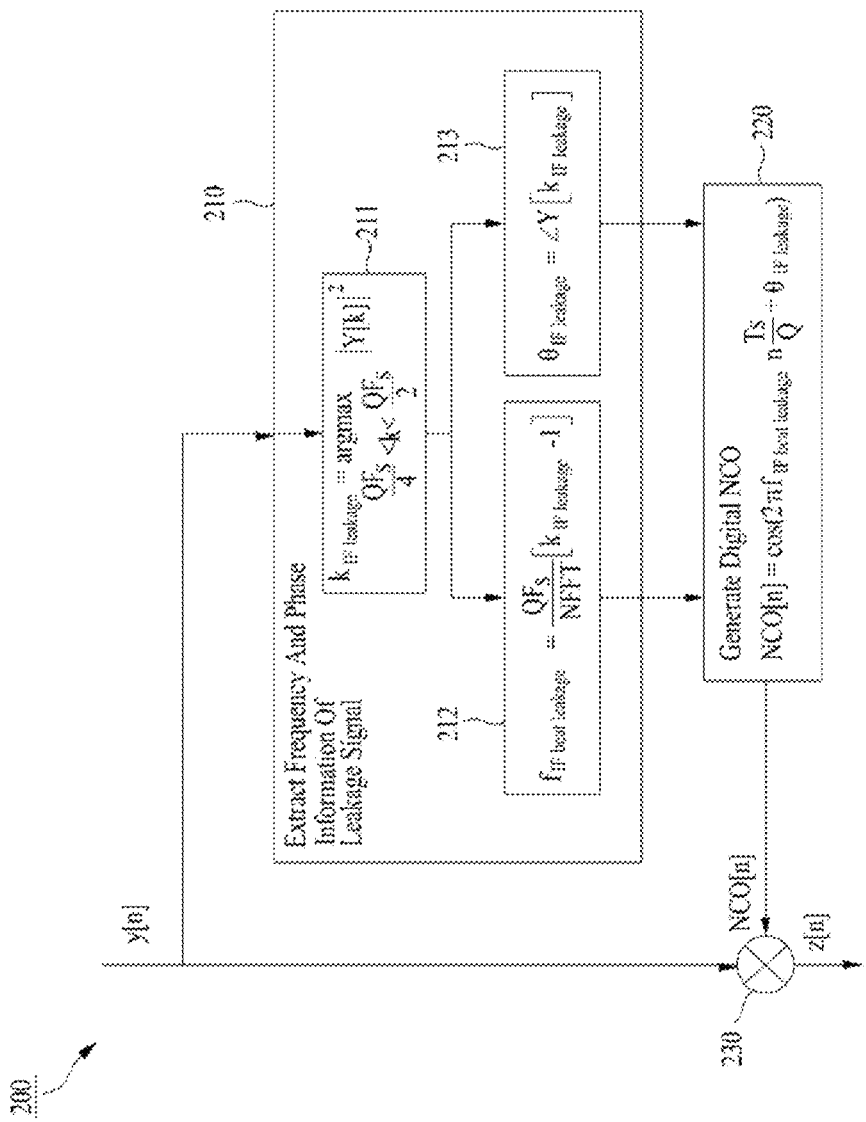
FIG. 2 is a block diagram illustrating a configuration of an embodiment for a leakage signal attenuation stage shown in FIG. 1.

FIG. 2 is a block diagram illustrating a configuration of an embodiment for a leakage signal attenuation stage shown in FIG. 1. FIG. 4 is a drawing illustrating a process of implementing an SPC technique as a power spectrum.

A description will be given of a method for implementing an SPC technique with reference to FIGS. 1, 2, and 4. When sampling the beat signals with the ADC, an embodiment of the inventive concept may multiply the minimum available sampling frequency Fs by the Nyquist sampling theorem by a constant Q which is a positive rational number value to sample the beat signals to the oversampling frequency QFs. In other words, an embodiment of the inventive concept may set the sampling frequency of an ADC 1250 to QFs. The strategic frequency planning may allow the beat signals to include the IF carrier frequency $f_{IFcarrier}$ and may refer to designing the FMCW radar system such that the IF carrier frequency $f_{IFcarrier}$ is QFs(4N+1)/4. In this case, N may be 0 or a natural number. According to the analog bandwidth of the ADC 1250, although N is greater than or equal to 1, there may finally be a spectrum situation when N is 0 through the effect of undersampling. By designing the FMCW radar through such strategic frequency planning, an embodiment of the inventive concept may separate the sum-terms, which are the resulting undesired terms when the multiplication is finally carried out with the digital numerically controller oscillator (NCO) after the oversampled beat signals, as far away as possible from the difference-terms which are the desired terms. Furthermore, the sum-terms, which are the undesired terms, are around the center of the frequency domain, so the digital LPF may remove these obviously, if desired.

FIG. 4 illustrates the situation when N is 0, as a representative example. As shown in FIG. 4, it may be verified that, when the sum-terms, which are the undesired terms, are around the center of the frequency domain, an embodiment of the inventive concept may separate the sum-terms as far away as possible from the difference-terms which are the desired terms.

The strategic frequency planning described above may be roughly implemented as two methods. One of the two methods may be a method of adjusting the frequencies of the LOs in the TX RF stage 1140 and the RX RF stage 1220 such that the IF carrier frequency $f_{IFcarrier}$ is QFs(4N+1)/4. This method does not need the LO in the TX IF stage 1120 or the RX IF stage 1240. The other of the two methods may be a method of using all of the original radar components and may be a method of adjusting all of frequencies of the LOs of the TX RF stage 1140 and the RX RF stage 1220 and the LOs of the TX IF stage 1120 and the RX IF stage 1240, such that the IF carrier frequency $f_{IFcarrier}$ is QFs(4N+1)/4. After the IF carrier frequency $f_{IFcarrier}$ is QFs(4N+1)/4, through the RX IF stage 1240 including amplifiers and filters, the beat signals may be represented as Equation 15 below.

$$y(t) = \underbrace{A'_{Leakage}\cos(2\pi(f_{IFbeatleakage})t + \theta_{IFleakage} + \varphi_{IFleakage}(t))}_{Leakage} +$$

$$\underbrace{\sum_{k=1}^{K} A'_{T,k}\cos\left(2\pi\overline{(f_{IFbeatleakage} + f_{beattargets,k})}^{f_{IFbeattargets,k}}t + \theta_{IFtargets,k} + \varphi_{IFtargets,k}(t)\right)}_{Targets}$$

[Equation 15]

Herein, $A'_{Leakage}$ and $A'_{T,k}$ refer to the amplitude of the leakage signal as the beat signal after passing the RX IF stage 1240 and the amplitude of the target signals, respectively.

When y(t) is oversampled to the sampling frequency of QFs via the ADC 1250, the beat signals of Equation 15 above may be represented as Equation 16 below.

$$y[n] = \underbrace{A'_{Leakage}\cos\left(2\pi(f_{IFbeatleakage})n\frac{Ts}{Q} + \theta_{IFleakage} + \varphi_{IFleakage}\left(n\frac{Ts}{Q}\right)\right)}_{Leakage} +$$

$$\underbrace{\sum_{k=1}^{K} A'_{T,k}\cos\left(2\pi\overline{(f_{IFbeatleakage} + f_{beattargets,k})}^{f_{IFbeattargets,k}}n\frac{Ts}{Q} + \theta_{IFtargets,k} + \varphi_{IFtargets,k}\left(n\frac{Ts}{Q}\right)\right)}_{Targets}$$

[Equation 16]

Herein, Ts/Q=1/QFs, and this refers to the sampling time interval.

y[n] may be input to the digital signal processing stage 1260, may pass through the leakage signal attenuation stage 1261, and may pass through the signal processing suitable for the radar purposes at the data processing stage 1262.

A description will be given of the leakage signal attenuation stage 1261 with reference to FIG. 2. As shown in FIG. 2, the large power of the leakage signal is a problem. However, when extracting the frequency and phase information of the leakage signal in operation 210, an embodiment of the inventive concept may make a good use of such a problem. In operation 211, an embodiment of the inventive concept may obtain Y[k] through the NFFT-point fast Fourier transform (FFT) with the zero-padding suitable for y[n], may obtain the spectrum in the form of magnitude response, and may fine the index $k_{IFleakage}$ of the leakage signal as the beat signal at the IF stage with the peak searching in the range of QFs/4<k<QFs/2.

In this case, NFFT may refer to the sum of the total number of real samples and inserted zero-pads.

The IF carrier frequency $f_{IFcarrier}$ is finally in the location of QFs/4. Generally, the beat frequency $f_{beatleakage}$ of the leakage signal, which comes from the total internal delay $\tau_{int}$, is much smaller than the IF carrier frequency $f_{IFcarrier}$. Therefore, the index corresponding to the entire beat frequency ($f_{IFbeatleakage}=f_{IFcarrier}+f_{beatleakage}$) of the leakage signal at the IF stage may exist within QFs/4<k<QFs/2. Furthermore, since the leakage signal has the largest magnitude, an embodiment of the inventive concept may find $k_{IFleakage}$ through the peak searching. In operation 213, an embodiment of the inventive concept may extract the entire beat frequency value $f_{IFbeatleakage}$ of the leakage signal at the IF stage by substituting the found $f_{IFbeatleakage}$ into the formula of operation 212 and may extract the constant phase value $\theta_{IFleakage}$ by substituting $k_{IFleakage}$ into the phase response of Y[k]. In operation 220, an embodiment of the inventive concept may generate the digital NCO with the beat frequency value $f_{IFbeatleakage}$ and the constant phase value $\theta_{IFleakage}$ using the entire beat frequency value $f_{IFbeatleakage}$ of the leakage signal and the constant phase value $\theta_{IFleakage}$ at the IF stage, extracted in operations 212 and 213. In this case, the generated NCO may be represented as Equation 17 below.

$$NCO[n] = \cos\left(2\pi f_{IFbeatleakage}n\frac{Ts}{Q} + \theta_{IFleakage}\right)$$

[Equation 17]

The last down-conversion may be conducted by multiplying digital NCO and y[n]. Considering only the difference-terms which are the desired terms among the resulting terms, z[n] finally output by the mixer 230 may be represented as Equation 18 below.

$$z[n] = \underbrace{\frac{A'_{Leakage}}{2}\cos\left(\varphi_{IFleakage}\left(n\frac{Ts}{Q}\right)\right)}_{Leakage} +$$

$$\underbrace{\sum_{k=1}^{K} A'_{T,k}\cos\left(2\pi(f_{beattargets,k})n\frac{Ts}{Q} + \theta'_{targets,k} + \varphi_{IFtargets,k}\left(n\frac{Ts}{Q}\right)\right)}_{Targets}$$

[Equation 18]

Herein, $\theta'_{targets,k}=\theta_{IFtargets,k}-\theta_{IFleakage}$.

As described above, in an embodiment of the inventive concept, the phase noise of the leakage signal is concentrated on the phase point when the domain is 0 in the cosine function, that is, the stationary point, and the phase noise indicated as voltage or current noise is significantly reduced in magnitude.

FIG. 5 is a drawing illustrating an example of the results of an average power spectrum with or without an SPC technique in a situation where there is only a leakage signal. FIG. 5 is a drawing illustrating an example of the results of the experiment where the radar system of FIG. 1 is actually set up and is done in a situation where there is only the leakage signal with no target.

Herein, FIG. 5 is a comparison of the average power spectrum without the SPC technique and the average power spectrum with the SPC spectrum. An embodiment of the inventive concept may take an average on the results of 100 power spectra for a clear comparison, which reduces the variance of the noise.

As shown in FIG. 5, to verify that the noise floor which is not good in the power spectrum without the SPC technique is due to the phase noise of the leakage signal as the beat signal, an embodiment of the inventive concept may measures the real phase noise (average the 10 measurements) with the spectrum analyzer and may overlap the result graph (the measured phase noise). Seeing that the average power spectrum without the SPC technique is identical to the graph of the real phase noise, it may be seen that the noise floor which is not good in the power spectrum without the SPC technique is due to the phase noise of the leakage signal as the beat signal. It may be seen that the noise floor in the average power spectrum with the SPC technique is more significantly reduced than that in the average power spectrum without the SPC technique over the overall frequency or the overall distance domain.

As may be observed from the description above, the FMCW radar system according to an embodiment of the inventive concept may attenuate the leakage signal without the necessity of an additional component by applying the SPC technique.

FIGS. 6A to 6C are drawings illustrating an example of the results of a real-time power spectrum with or without the SPC technique in a situation where there are a leakage signal and targets. FIGS. 6A to 6C are a comparison of only one spectrum result in the situation where there are targets together with the leakage signal because it does not generally take an average on the spectra in the real-time target detection situation and illustrate a comparison by using the latest drones of DJI, Spark and Inspire I, as targets.

In FIGS. 6A to 6C, targets are intentionally placed at a slightly askew direction from the main axis of the radiation pattern of the antenna, it is tested whether an embodiment of the inventive concept is well applied when the received signals are weak. FIGS. 6A to 6C illustrate states where drones, DJI Spark and Inspire I, fly 96.93 m and 129.24 m away from the antenna using the GPS function of the drones.

As may be seen from the spectrum (FIG. 6A) without the SPC technique, the spectrum (FIG. 6B) with the SPC technique, and the spectrum (FIG. 6C) of a comparison of the spectrum without the SPC technique and the spectrum with the SPC technique together, all target signals without and with the SPC technique are in magnitude without change, whereas the noise floor is more significantly reduced in the spectrum with the SPC technique than that in the spectrum without the SPC technique. In other words, the radar system according to an embodiment of the inventive concept may attenuate the leakage signal to significantly increase the SNR by applying the SPC technique.

Furthermore, in FIGS. 6A to 6C, an embodiment of the inventive concept may verify the correction effect of the distance error which comes from the total internal delay $\tau_{int}$. Seeing FIG. 6C, it may be verified that the spectrum with the SPC technique is a little more shifted to the left than the spectrum without the SPC technique. This is because the beat frequency $f_{beatleakage}$, which comes from the total internal delay $\tau_{int}$ which exists as a kind of offset frequency in the common method, is removed by the SPC technique.

Thus, only the real beat frequency $f_{beattargets,k}$, which comes from the delay $\tau_{T,k}$ due to only targets remains in the target signals as the beat signals, so the correction of the distance error may be conducted. Seeing FIG. 6B, it may be verified that the distance values of the measured target are almost the same as the location of the real targets described above.

As such, the FMCW radar system according to an embodiment of the inventive concept may apply the SPC technique to attenuate the phase noise of the leakage signal and may lower the noise floor over the overall spectrum to attenuate the leakage signal and increase the SNR of the target signal.

Furthermore, the FMCW radar system according to an embodiment of the inventive concept may be implemented with only the strategic frequency planning and oversampling, and digital signaling not to need an additional component, so additional costs are not incurred.

Furthermore, the FMCW radar system according to an embodiment of the inventive concept may correct the distance error due to the internal delay of the radar system.

As described above, the FMCW radar system according to an embodiment of the inventive concept may set the IF carrier frequency included in the beat signals to a predetermined frequency and may oversample the beat signals to a predetermined oversampling frequency based on the Nyquist sampling theorem to make the phase noise of the leakage signal effectively concentrated on the stationary point, and may concentrate the phase noise of the leakage signal on the stationary point using the SPC technique to attenuate the leakage signal and increase the SNR of the target signal.

Figure 7:
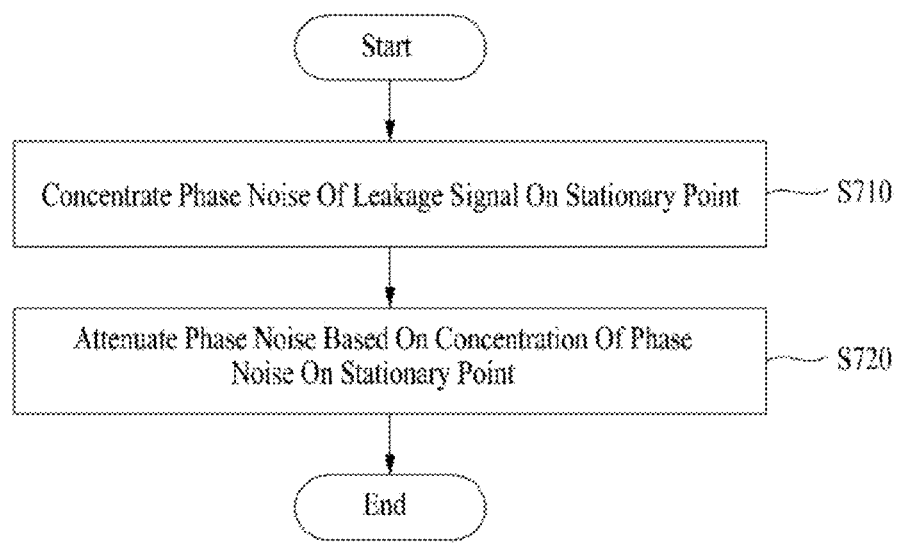
FIG. 7 is a flowchart illustrating a method for attenuating a leakage signal according to an embodiment of the inventive concept.

FIG. 7 is a flowchart illustrating a method for attenuating a leakage signal according to an embodiment of the inventive concept.

Referring to FIG. 7, in operation S710, an FMCW radar system according to an embodiment of the inventive concept may concentrate a phase noise of a leakage signal on a stationary point.

Herein, in operation S710, the FMCW radar system may concentrate the phase noise of the leakage signal on the stationary point of the cosine function using an SPC technique to significantly reduce the phase noise represented as voltage or current noise and may use strategic frequency planning and oversampling for implementing the SPC technique.

For example, in operation S710, the FMCW radar system may include the IF carrier frequency $f_{IFcarrier}$ in beat signals, may conduct strategic frequency planning such that the IF carrier frequency is $QFs(4N+1)/4$, may sample the beat signals to the oversampling frequency QFs by multiplying the minimum available sampling frequency Fs by the Nyquist sampling theorem by a constant Q which is a positive rational number value to concentrate the phase noise of the leakage signal on the stationary point of the cosine function.

In operation S710, after the oversampling, the FMCW radar system may obtain a spectrum in the form of magnitude response through the FFT with sufficient zero-padding, may fine an index of a leakage signal with partial peak searching, may extract a beat frequency value and a constant phase value of the leakage signal with the found index, may generate a digital NCO with the beat frequency value and the constant phase value, and may conduct the last down-conversion by multiplying the digital NCO and the oversampled beat signals, thus attenuating the phase noise of the leakage signal. In other words, in operation S720, the phase noise of the leakage signal may be concentrated on a function value when a domain is 0 in the cosine function, that is, the stationary point, and the phase noise represented as voltage or current noise may be significantly reduced in magnitude. Thus, the FMCW radar system may increase the SNR of the target signal.

In operation S720, the FMCW radar system may attenuate the phase noise of the leakage signal based on the phase noise concentrated on the stationary point in operation 710 to attenuate the leakage signal and increase the SNR of the target signal.

It is apparent to those skilled in the art that, although the description is omitted in the method of FIG. 7, the respective operations performing FIG. 7 may include all details described in FIGS. 1 to 6C.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to embodiments of the inventive concept, the FMCW radar system may attenuate the phase noise of the leakage signal and may lower the noise floor over the overall spectrum to attenuate the leakage signal and increase the SNR of the target signal.

In other words, according to embodiments of the inventive concept, the noise floor in the power spectrum may be significantly reduced over the overall frequency and the SNR of the target signals may be increased. An embodiment of the inventive concept may be implemented with only the strategic frequency planning, the oversampling, and the digital signaling, so additional costs are not incurred without the necessity of an additional component. In contrast to complexity of implementation when compared with the related art, the degree to which the leakage signal is attenuated may be excellent.

According to embodiments of the inventive concept, the FMCW radar system may correct the distance error due to the internal delay of the radar system.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for attenuating a leakage signal in a radar system, the method comprising:
   transmitting at least one signal via a transmitter;
   receiving at least one reflection via a receiver;
   reducing the leakage signal between the transmitter and receiver, comprising:
      concentrating a phase noise of the leakage signal by limiting signal processing to a stationary point of a cosine function via a stationary point concentration (SPC) technique, the stationary point of the cosine function being a most insensitive point of the cosine function; and
      attenuating the phase noise based on the concentration of the phase noise of the stationary point of the cosine function, wherein the SPC technique comprises setting an intermediate frequency (IF) included in beat signals to a predetermined frequency and oversampling the beat signals to a predetermined oversampling frequency based on a Nyquist sampling theorem, wherein the oversampling the beat signals to a predetermined oversampling frequency based on a Nyquist sampling theorem comprises multiply a minimum available sampling frequency by the Nyquist sampling theorem by a positive rational number greater than one to sample the beat signals to the predetermined oversampling frequency, and wherein the concentrating the phase noise of the leakage signal further comprises multiplying the oversampled beat signals and a numerically controlled oscillator (NCO) signal to remove a beat frequency and phase of the leakage signal.

2. The method of claim 1, wherein the concentrating comprises:

performing fast Fourier transform (FFT) with zero-padding with respect to the oversampled beat signals, obtaining a spectrum in the form of magnitude response, and finding an index of a leakage signal as a beat signal with peak searching;

extracting a beat frequency value of the leakage signal based on the index of the leakage signal;

extracting a constant phase value of the leakage signal based on the index of the leakage signal; and generating the numerically controlled oscillator (NCO) signal based on the beat frequency value and the constant phase value.

3. A radar system for attenuating a leakage signal, the system comprising:

a transmitter to transmit at least one signal;

a receiver to receive at least one refection and reduce the leakage signal between the transmitter and the receiver, wherein the receiver comprises means configured to:

concentrate a phase noise of the leakage signal by limiting signal processing to a stationary point of a cosine function via a stationary point concentration (SPC) technique, the stationary point of the cosine function being a most insensitive point of the cosine function; and attenuate the phase noise based on the concentration of the phase noise of the stationary point of the cosine function, wherein the SPC technique comprises setting an intermediate frequency (IF) included in beat signals to a predetermined frequency and oversampling the beat signals to a predetermined oversampling frequency based on a Nyquist sampling theorem, and wherein the oversampling the beat signals to a predetermined oversampling frequency based on a Nyquist sampling theorem comprises multiply a minimum available sampling frequency by the Nyquist sampling theorem by a positive rational number greater than one to sample the beat signals to the predetermined oversampling frequency; and multiply the oversampled beat signals and a numerically controlled oscillator (NCO) signal to remove a beat frequency and phase of the leakage signal.

4. The system of claim 3, wherein the means is further configured to:

perform FFT with zero-padding with respect to the oversampled beat signals, obtain a spectrum in the form of magnitude response, and fine an index of a leakage signal as a beat signal with peak searching;

extract a beat frequency value of the leakage signal based on the index of the leakage signal and extract a constant phase value of the leakage signal based on the index of the leakage signal; and generate the NCO signal based on the beat frequency value and the constant phase value.

5. The method of claim 1, wherein setting the intermediate frequency (IF) comprises calculating the IF carrier frequency according to the equation $QFs(4N+1)/4$, wherein QFs is the predetermined oversampling frequency and N is 0 or a natural number.

6. The method of claim 1, wherein receiving the leakage signal comprises receiving the leakage signal from an analog to digital converter (ADC) of the radar system.

7. The system of claim 3, wherein setting the intermediate frequency (IF) comprises calculating the IF carrier frequency according to the equation $QFs(4N+1)/4$, wherein QFs is the predetermined oversampling frequency and N is 0 or a natural number.

8. The system of claim 3, wherein the means configured to receive the leakage signal is configured to receive the leakage signal from an analog to digital converter (ADC) of the radar system.

* * * * *